No. 634,897. Patented Oct. 17, 1899.
R. H. MARTIN.
FILTER.
(Application filed Jan. 23, 1899.)
(No Model.) 2 Sheets—Sheet 1.
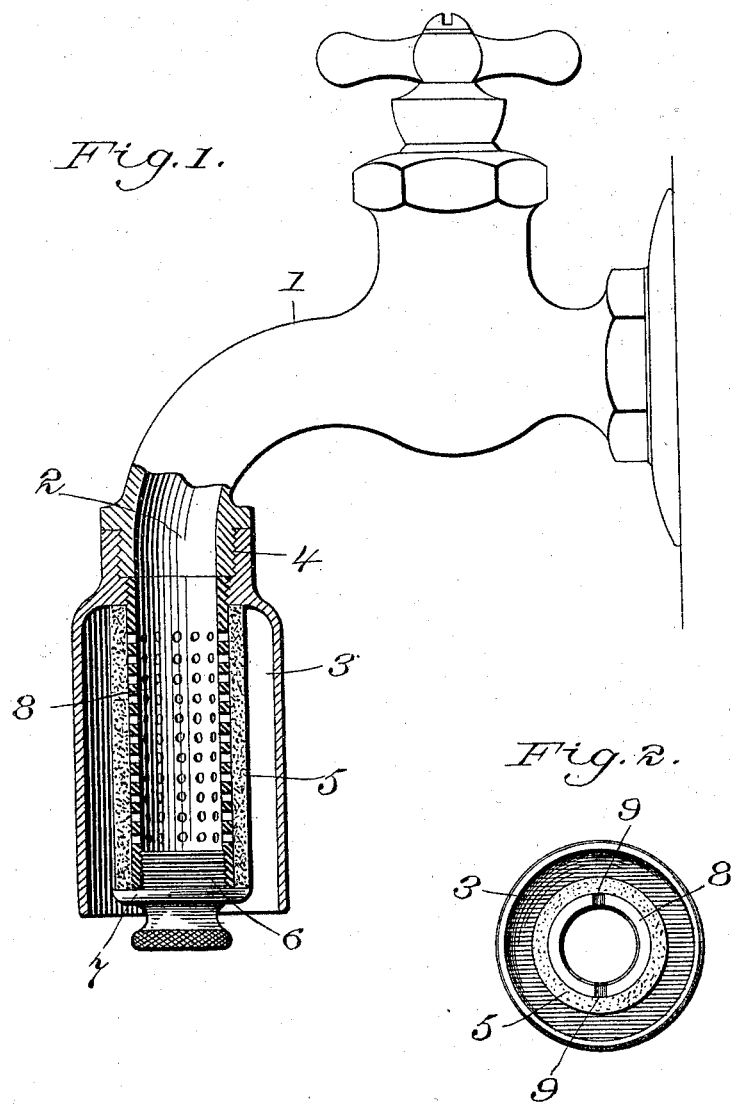

No. 634,897.  
R. H. MARTIN.  
FILTER.  
(Application filed Jan. 23, 1899.)  
Patented Oct. 17, 1899.
(No Model.)  
2 Sheets—Sheet 2.
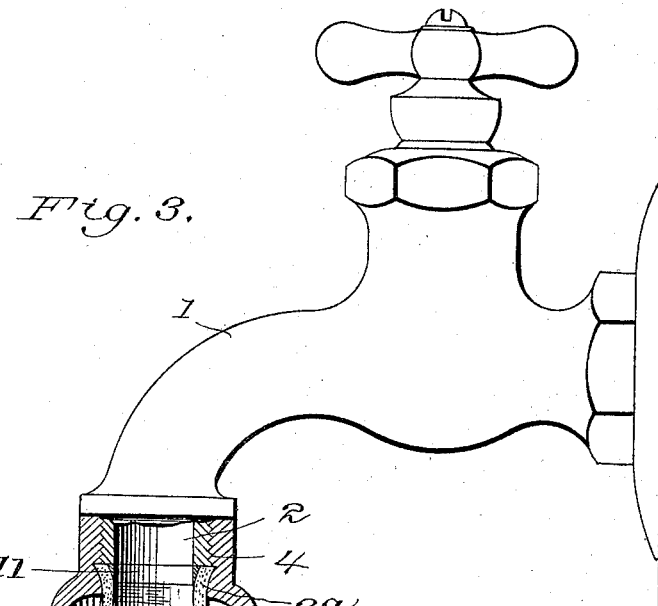
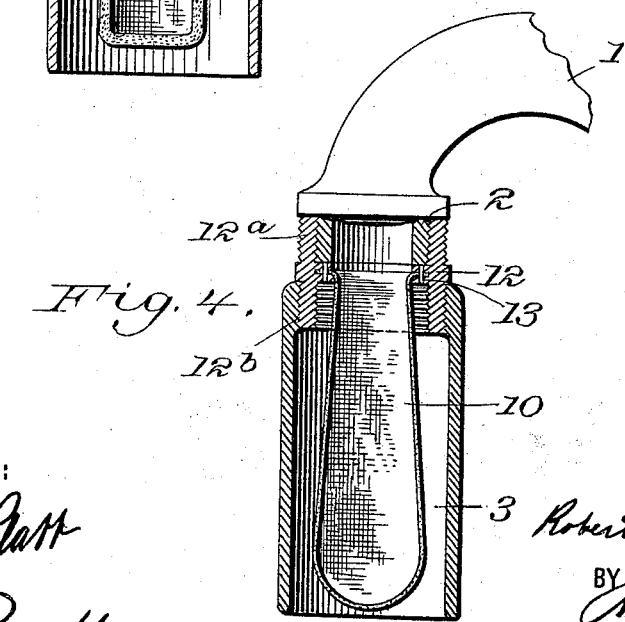
WITNESSES:
INVENTOR  
Robert H. Martin  
BY  
ATTORNEY

UNITED STATES PATENT OFFICE.

ROBERT H. MARTIN, OF NEW YORK, N. Y.

FILTER.

SPECIFICATION forming part of Letters Patent No. 634,897, dated October 17, 1899.

Application filed January 23, 1899. Serial No. 703,093. (No model.)

*To all whom it may concern:*

Be it known that I, ROBERT H. MARTIN, a citizen of the United States of America, and a resident of the city of New York, borough of Manhattan, county of New York, and State of New York, have invented certain new and useful Improvements in Filters, of which the following is a specification.

My invention consists in an improved form of filter for domestic use. It is intended to be attached to the ordinary faucet having a threaded end.

The disadvantage in filters heretofore put upon the market has generally been that there was no simple and effective means for cleaning or renewing them. As a result the filter soon became clogged and both useless and poisonous. My invention overcomes this difficulty by providing a simple form of filter which may be renewed at a very slight cost every morning, if desired.

The preferred form of apparatus embodying my invention is disclosed in the accompanying sheet of drawings, in which—

Figure 1 is a side elevation of the ordinary kitchen-faucet with my filter attached, the filter being shown in section. Fig. 2 is a bottom view of the filter with the plug removed. Fig. 3 is a modification. Fig. 4 is a further modification designed to be reversible.

Throughout the drawings like reference-figures refer to like parts.

An ordinary water-faucet 1 has usually a threaded nozzle 2 for purposes of attaching a hose or filter. I provide a bell 3, of any suitable metal or other material, with an opening in its upper end internally threaded, as at 4, so as to screw onto the nozzle 2 of the faucet. Within this bell is a perforated cylinder 8, of metal or wire-gauze, which is adapted to screw into the opening at the top of the bell 3 substantially flush with said opening, and thus abut against the end of the faucet-nozzle, and being practically in line with the discharge-opening of said faucet it becomes a continuation thereof. Opposite the perforations in said cylinder 8 a filtering medium 5 is arranged either by placing a section of hose formed of the filtering medium over the perforated cylinder, as shown, or otherwise. The lower end of the perforated cylinder is closed, preferably, by screw-plug 6, which has a flange 7, adapted to retain the filtering medium 5 in position when the same is outside of the perforated cylinder. The lower end of the perforated cylinder 8 may have its walls transversely slotted, as shown at 9 9 in Fig. 2, in order to permit the use of a screw-driver or other convenient tool for unscrewing the cylinder from the bell.

In the modification shown in Fig. 3 a bag of asbestos 10 or other filtering medium is substituted for the perforated cylinder with the filtering material opposite its perforations. The mouth of this bag-filter is seated in a flaring seat $3^a$ at the upper portion of the bell and held there by the cone-shaped collar 11, which is forced down on it when the bell is screwed onto the nozzle of the faucet.

In the further modification shown in Fig. 4 a similar filter is produced; but in this case the filtering-bag 10 is reversible. The bag is mounted in a double coupling 12, which has oppositely-extending portions $12^a$ and $12^b$, which are both externally and internally threaded. The mouth of the bag is held in a circular recess in the interior of said coupling 12 by a series of pins 13 or is attached to said coupling by any other convenient means. The coupling can then be screwed onto the nozzle of the faucet and the bell 3 screwed onto the other end of the coupling, so as to surround the bag.

The method of operating my invention is as follows: I preferably employ asbestos hose for the filtering medium 5, which may be cut up into proper lengths either by the user or by the person supplying the filters. The hose is slipped over the perforated cylinder 8, as shown, and held in place by screwing in the plug 6. The filter is then attached to the faucet by screwing it onto the aforesaid nozzle 2. When the user opens the faucet 1, the water will rush down into the perforated cylinder 8, out through the perforations therein, and through the filtering medium 5. All lateral jets and streams will be intercepted by the bell 3, and the whole volume of water passing through the filter will drop down from the mouth of the bell into any receptacle held underneath it. At proper intervals, say every morning, the plug 6 may be removed, the section of filtering medium 5 withdrawn, the perforations of the cylinder 8 cleaned out by allowing the water to flow for a moment, and then the washed filtering medium 5 or a clean section of asbestos hose replaced and the plug 6 screwed in. A practically new filter will thus be obtained. In case the cylinder 8 is to be removed the plug 6 can be unscrewed and a screw-driver inserted in the slot 9 9. Then the cylinder 8 can be unscrewed. It might be convenient to set the threaded plug 6 into the cylinder 8 hard enough so that the friction between it and the cylinder will be greater than between the cylinder and the bell, so that by turning the plug 6 the entire cylinder 8 will be revolved and unscrewed, and thus removed for removing and replacing the filter medium 5.

The operation of the modification shown in Fig. 3 is similar to that before described, so far as the filtering action is concerned. In removing the filter for cleaning or replacement the bell 3 is of course unscrewed and the bag 10 lifted out and either reversed or a new one put in. When reversed, the water should be allowed to run freely through the filter for a short time to wash away the impurities adhering to the exterior of the bag in its reversed position. The operation of the modifications shown in Fig. 4 is the same, except that in this case the bag can be reversed without removing it from the coupling 12, and the other end of the coupling 13 can then be screwed onto the faucet and the bell 3 then screwed into position.

It is evident that various changes could be made in the details of the apparatus disclosed without departing from the spirit and scope of my invention. The filtering medium might be placed in other positions than on the outside of the cylinder 8, so long as it covers the perforations therein. The methods of attaching the cylinder and bell and the faucet together might be varied. Other forms of plugs for the lower end of the cylinder might be employed, &c.; but all these I consider changes in form and not in principle.

Having therefore described my invention, what I claim as new, and desire to protect by Letters Patent, is—

1. In a filter the combination of the bell for attachment to the service-pipe, the chamber therein, having perforated walls and an opening communicating with the service-pipe, and a filtering medium arranged over said perforations, substantially as described.

2. In a filter the combination of the bell, means for attaching said bell to the service-pipe, a perforated cylinder within said bell directly connected to the service-pipe, and a filtering medium covering the perforations in said cylinder, substantially as described.

3. In a filter the combination of the bell, means for attaching said bell to the service-pipe, a removable perforated cylinder within said bell directly connected to the service-pipe, and a filtering medium covering the perforations in said cylinder, substantially as described.

4. In a filter the combination of the bell adapted to be attached to the end of the faucet, a perforated cylinder which has one end closed and the other open and abutting against the end of the faucet, said cylinder being located within said bell, and a cylinder of filtering medium fitting over said perforated cylinder, substantially as described.

5. In a filter the combination of the bell adapted to be attached to the service-pipe, a perforated cylinder within said bell and communicating with the service-pipe, a filtering medium arranged in operative relation to said perforations, and the removable plug for the outer end of the cylinder, substantially as described.

6. In a filter the combination of the bell adapted to be attached to the service-pipe, a perforated cylinder within said bell and communicating with the service-pipe, a filtering medium arranged in operative relation to said perforations, and the removable plug for the outer end of the cylinder, said plug being adapted to hold the filtering medium in position, substantially as described.

7. In a filter the combination of the bell arranged to screw onto the end of the faucet, the perforated cylinder arranged to screw into the interior of the bell in line with the discharge-opening of the faucet, the filtering medium arranged opposite the perforations in the cylinder and the plug for the lower end of said cylinder, substantially as described.

8. In a filter the combination of the bell arranged to screw onto the end of the faucet, the perforated cylinder arranged to screw into the interior of the bell in line with the discharge-opening of the faucet, the section of asbestos hose fitting over the perforated cylinder, and the screw-plug which fits into the lower end of the cylinder and has a flange which abuts against the lower end of the asbestos hose, substantially as described.

9. In a filter the combination of the bell arranged to screw onto the end of the faucet, the perforated cylinder arranged to screw into the interior of the bell in line with the discharge-opening of the faucet, the section of asbestos hose fitting over the perforated cylinder and the screw-plug which fits into the lower end of the perforated cylinder, the walls of the lower end of the cylinder being slotted transversely, as and for the purpose described.

10. In a filter the combination of the bell having an opening at the top, a perforated cylinder within said bell and having one end flush with said opening in the top of the bell, a filtering medium extending over the perforations in the cylinder, and a plug closing the lower end of said cylinder, substantially as described.

11. In a filter the combination of the bell for attachment to the service-pipe, the cylinder of asbestos formed of a section of asbestos hose closed at one end, and means for attaching the open end of said cylinder to the upper end of the bell in line with the discharge from the service-pipe, substantially as described.

12. In a filter the combination of the bell for attachment to the service-pipe, the reversible cylinder of filtering medium closed at one end, and means for attaching the open end of said cylinder to the upper end of the bell in line with the discharge from the service-pipe, substantially as described.

Signed by me at New York city, New York, this 17th day of January, 1899.

ROBERT H. MARTIN.

Witnesses:
A. PARKER SMITH,
GEORGE W. GLADWIN.